United States Patent
Barker, Jr. et al.

(10) Patent No.: US 9,282,142 B1
(45) Date of Patent: Mar. 8, 2016

(54) TRANSFERRING VIRTUAL DATACENTERS BETWEEN HOSTING LOCATIONS WHILE MAINTAINING COMMUNICATION WITH A GATEWAY SERVER FOLLOWING THE TRANSFER

(75) Inventors: David Wareing Barker, Jr., San Marcos, CA (US); Daniel J. Fregeau, Escondido, CA (US); Todd Michael Lauinger, Cardiff, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/174,213

(22) Filed: Jun. 30, 2011

(51) Int. Cl.
G06F 15/173 (2006.01)
H04L 29/08 (2006.01)

(52) U.S. Cl.
CPC ............ *H04L 67/10* (2013.01); *H04L 67/1004* (2013.01)

(58) Field of Classification Search
CPC .............................. H04L 67/10; H04L 67/1004
USPC ............................. 718/1; 709/220–223, 226
See application file for complete search history.

(56) References Cited

U.S. PATENT DOCUMENTS

| | | | |
|---|---|---|---|
| 7,080,378 B1 * | 7/2006 | Noland et al. | 718/104 |
| 7,181,542 B2 * | 2/2007 | Tuomenoksa et al. | 709/250 |
| 7,373,660 B1 * | 5/2008 | Guichard et al. | 726/15 |
| 7,574,491 B2 | 8/2009 | Stein et al. | |
| 7,784,060 B2 | 8/2010 | Baumberger | |
| 7,793,101 B2 | 9/2010 | Wipfel et al. | |
| 7,933,996 B2 | 4/2011 | Rechterman | |
| 7,949,677 B2 | 5/2011 | Croft et al. | |
| 7,987,497 B1 * | 7/2011 | Giles et al. | 726/2 |
| 8,103,842 B2 | 1/2012 | Murase et al. | |
| 8,275,868 B2 | 9/2012 | Rechterman | |
| 8,280,431 B2 | 10/2012 | Sedayao et al. | |
| 8,321,862 B2 | 11/2012 | Swamy et al. | |
| 2002/0023210 A1 * | 2/2002 | Tuomenoksa et al. | 713/161 |
| 2005/0120160 A1 * | 6/2005 | Plouffe et al. | 711/1 |
| 2006/0069761 A1 | 3/2006 | Singh et al. | |
| 2008/0013481 A1 * | 1/2008 | Simons et al. | 370/328 |
| 2008/0037557 A1 * | 2/2008 | Fujita et al. | 370/395.53 |
| 2008/0307415 A1 | 12/2008 | Carter | |
| 2009/0055693 A1 * | 2/2009 | Budko et al. | 714/57 |
| 2009/0106405 A1 * | 4/2009 | Mazarick et al. | 709/222 |
| 2009/0217267 A1 | 8/2009 | Gebhart et al. | |
| 2009/0259945 A1 * | 10/2009 | De Spiegeleer | 715/744 |
| 2010/0070870 A1 * | 3/2010 | Halperin et al. | 715/742 |
| 2010/0088150 A1 * | 4/2010 | Mazhar et al. | 705/10 |
| 2010/0106615 A1 | 4/2010 | Chadwick et al. | |
| 2010/0125712 A1 * | 5/2010 | Murase et al. | 711/162 |
| 2010/0138830 A1 | 6/2010 | Astete et al. | |
| 2010/0153482 A1 | 6/2010 | Kim | |
| 2010/0205286 A1 | 8/2010 | Rechterman | |
| 2010/0205302 A1 | 8/2010 | Rechterman | |
| 2010/0274890 A1 | 10/2010 | Patel et al. | |
| 2011/0010711 A1 | 1/2011 | Patwardhan | |

(Continued)

*Primary Examiner* — Lance L Barry
(74) *Attorney, Agent, or Firm* — John A. Gould; Theodore A. Chen; Krishnendu Gupta (57) ABSTRACT

This disclosure relates to a system for operating virtual datacenters. The disclosure describes a system in which virtual datacenters may be self contained logical units. These units may contain workloads comprising one or more virtual machines. This can allow for enhanced portability to a variety of hosting environments, and may allow the virtual datacenters to be transferred between environments. Virtual datacenters may be in communication with a gateway server prior to transfer, and may maintain this communication following the transfer.

8 Claims, 6 Drawing Sheets

(56) References Cited

U.S. PATENT DOCUMENTS

| | | |
|---|---|---|
| 2011/0019676 A1* | 1/2011 | Portolani et al. ......... 370/395.53 |
| 2011/0071983 A1* | 3/2011 | Murase ......................... 707/649 |
| 2011/0093849 A1 | 4/2011 | Chawla et al. |
| 2011/0307614 A1* | 12/2011 | Bernardi et al. .............. 709/227 |
| 2012/0016778 A1 | 1/2012 | Salle et al. |
| 2012/0054486 A1 | 3/2012 | Lakkavalli et al. |
| 2012/0054624 A1* | 3/2012 | Owens et al. ................. 715/735 |
| 2012/0089663 A1 | 4/2012 | Sedayao et al. |
| 2013/0013738 A1 | 1/2013 | Astete et al. |
| 2013/0136126 A1 | 5/2013 | Wang et al. |
| 2013/0238785 A1 | 9/2013 | Hawk |

* cited by examiner

TRANSFERRING VIRTUAL DATACENTERS BETWEEN HOSTING LOCATIONS WHILE MAINTAINING COMMUNICATION WITH A GATEWAY SERVER FOLLOWING THE TRANSFER

FIELD

This invention relates generally to information management services, and more particularly to a system and method for operating a virtual datacenter.

BACKGROUND

The cost, complexity, and time required to implement on-premise information management services often far exceeds their business value. Valuable resources may be consumed in tasks such as acquiring and racking hardware, installing software, configuring management and backup services, and testing the new environment. When adopting new information management services, it is necessary for users to ensure that the problem being solved is large enough to rationalize these expenses.

These challenges to the user may also be problematic for a supplier. Prospective customers may be hesitant to adopt new systems due to limited resources and exorbitant costs. This may decrease a supplier's income and directly impact their profits. Further, a supplier may be forced to continue offering services, such as technical support, for outdated systems. These services may divert valuable assets from more profitable ventures.

Technical support may present a further issue to the supplier because user environments may not be unique. Users may build these environments using a variety of different hardware and software options. Even when best practices documents are provided there is no way to ensure that users are complying with best practices. As a result, technical issues which never should have arisen may need to be addressed. Such situations may result in significant losses to both the user and the supplier.

Despite these obvious limitations to on-premise resource management solutions, off-premise solutions may not be practical for, or available to, all users. For example, a large corporation may be reluctant to use an off-premise solution because of security concerns. They may feel that a local environment can be better protected than a remote one. There may also be industry standards or regulatory requirements which demand the end user maintain certain levels of control.

There is a need, therefore, for an improved method or system for implementing, distributing, and managing information management systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

Figure 1:
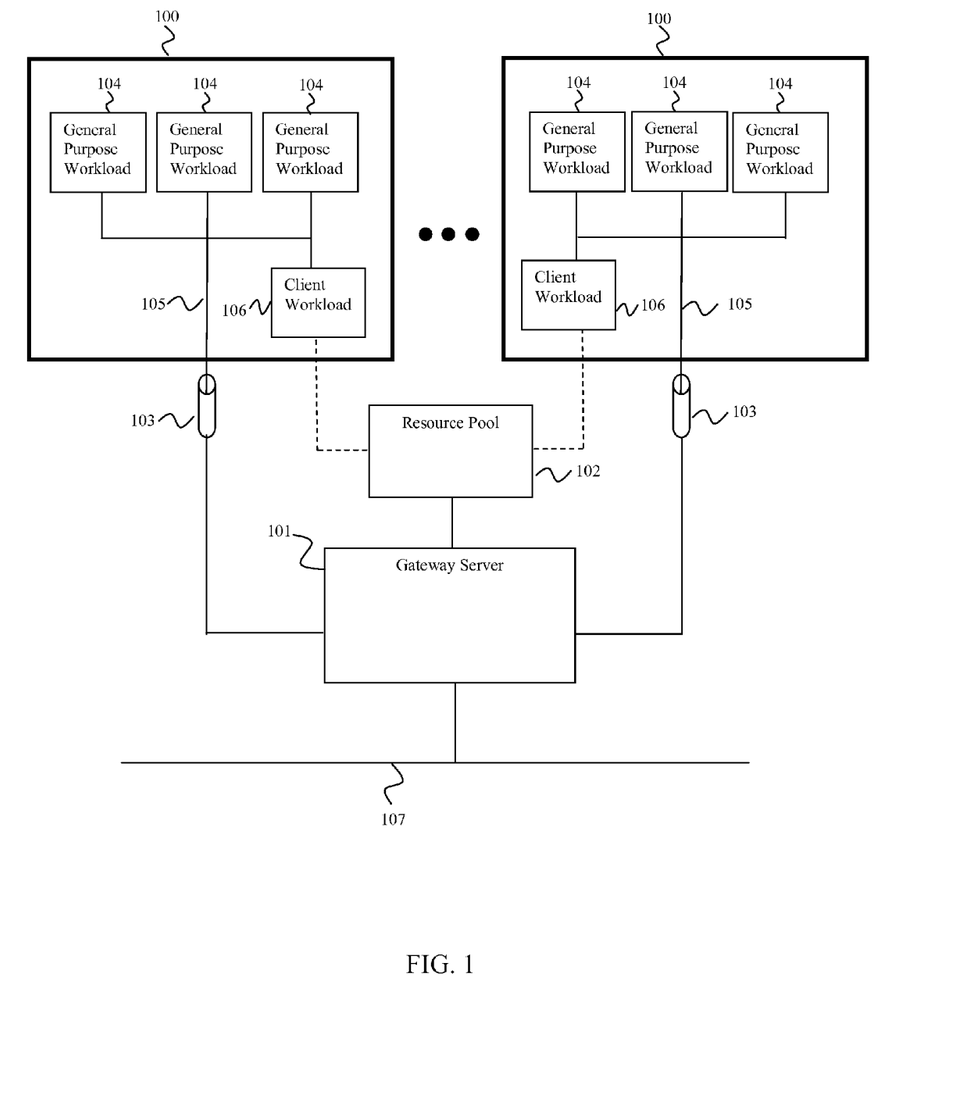
FIG. 1 is an overview of a virtual datacenter operations system.

FIG. 1 is an overview of a virtual datacenter operations system. A plurality of general purpose workloads 104 and at least one client workload 106 may be created inside a virtual datacenter 100. Workloads 106 and 104 may communicate with each other across virtual network 105. Virtual network 105 could communicate with gateway server 101 via network tunnel 103. The gateway server 101 may be in communication with the external network 107 and resource pool 102. Resource pool 102 may be used to provision client environments 106 or other resources to users who access the gateway server 101.

In some embodiments, the virtual datacenters 100 may be VMware "organizations" created using VMware's vCloud-Director, a product provided by VMWare Corporation, which is hereby incorporated by reference, among others In some embodiments, the virtual network 105 may be created using the vCloudDirector tool, a product provided by VMWare Corporation, which is hereby incorporated by reference, among others. Organizations may be logical units used to manage users or groups. An organization may also be used to manage physical resources. These physical resources may include storage, memory, or processing assets, among others. For example, one organization may be provisioned to use a single processor, 1 GB of memory, and 1 TB of storage.

Workloads 104 and 106 may comprise one or more virtual machines. Workloads 104 may be server environments running Unix, Linux, Solaris, OS X, Windows Server, or the like. Client workload 106 may be any client environment, such as Windows Remote Desktop Service. Further, client and server environments may exist within the same virtual datacenter 100. This allows complete enterprise solutions to operate within virtual datacenter 100. For example, a single virtual datacenter 100 may have an application server workload, a web server workload, and a plurality of remote desktop client workloads 106 to interact with the two server workloads. A single virtual datacenter 100 may also contain development, test, and production environments running as workloads 104 or 106.

Embodying a client and server environment within a single virtual datacenter 100 may also enhance a solution's portability. Placing both of these environments in a single logical unit may allow them to be moved together rather than independently. If the environments are not contained in this way, a user may be forced to transfer one and then the other; a process that may become more complicated based on the number of environments involved. Placing both environments in a single datacenter can allow the transfer to be a single step process.

Figure 2:
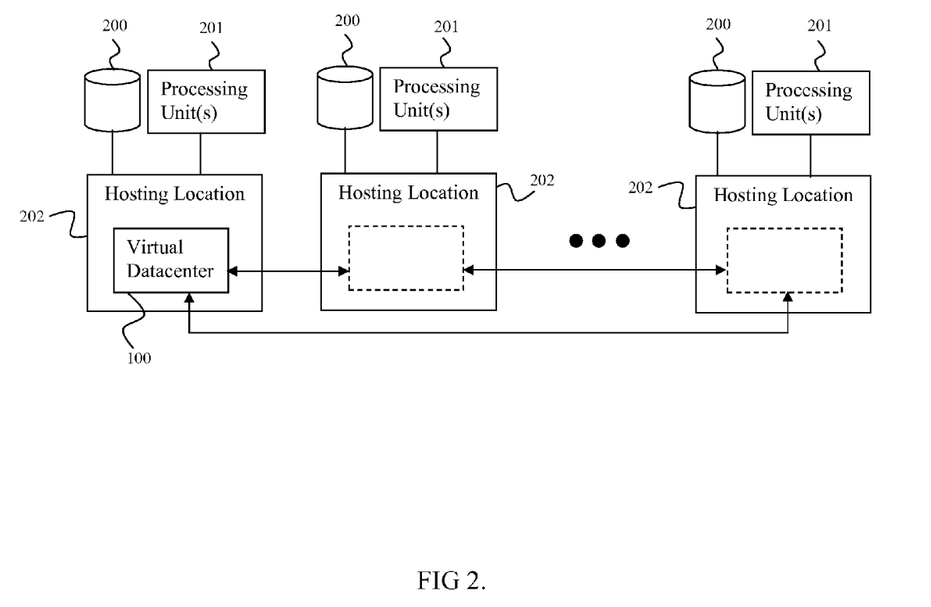
FIG. 2 is a diagram demonstrating the mobility of the datacenters.

FIG. 2 is a diagram demonstrating the mobility of the datacenters. Hosting locations 202 may be capable of hosting virtual datacenters 100. The hosting locations 202 may have access to storage 200 and processing units 201. The hosting locations 202 may also have access to other physical resources, such as memory.

Each hosting location 202 may be capable of hosting one or more virtual datacenters 100. The hosting locations 202 may be located at a variety of places, including on-premise or off-premise locations. Virtual datacenters 100 may be moved between hosting locations 202 as desired by the user, system administrator, or other authorized entity. In some embodiments, elements of a virtual datacenter 100 may exist on a variety of hosting locations 202. As a non-limiting example, a workload 104 or 106 which requires a large number of resources may be run at an off-premise location while the remaining workloads 104 or 106 are local. Transfer of the workloads may be accomplished through any means, including over a network or by using a physical storage device such as a flash drive.

This portability feature may be particularly beneficial to a user who is considering a hosted solution, but is not ready to commit. For example, a user who is interested in an off-premise hosting location 202, but is concerned about security, may choose to build a virtual datacenter 100 on local hardware. If at a later date the user chooses to adopt the off-premise solution, they can easily move their virtual datacenter 100 from the local hosting location 202 to the off premise one. Another reason a customer may wish to transfer their virtual datacenter 100 is if they suddenly need more compute or storage resources due to a business change. Rather than investing the time and money in purchasing and configuring new hardware, a user can simply push their virtual datacenter 100 to an off-premise hosting location 202 to instantly gain the needed resources. Conversely, the virtual datacenter 100 may also easily be moved from a remote location to a local one. The virtual datacenter 100 could also be transferred between on-premise machines or between off-premise machines as desired. As non-limiting examples, movement may be necessary if an accident occurs, if there are security concerns about a given location, or in the event of a natural disaster.

Virtual network 105 may communicate with gateway server 101 through network tunnel 103. Network tunnel 103 may be a VPN tunnel, SSH tunnel, or the like. Gateway server 101, in turn, may communicate with resource pool 102. Resource pool 102 can be associated with the client workloads 106 and may be used to provision resources to users accessing gateway server 101. These resources may commonly be client workloads 106, but are not limited to such. The resource pool 102 could also be used to provision other virtual resources, such as virtual machines, as well as physical resources, such as storage, memory, or compute resources.

In some embodiments, both gateway server 101 and resource pool 102 are managed using VMware's product VMware View. Gateway server 101 may be a View Security Server and the resource pool 102 may be a View Connection Server. Other gateway and resource provisioning tools may be used. The gateway and resource pool may operate on the same or separate hardware.

Figure 3:
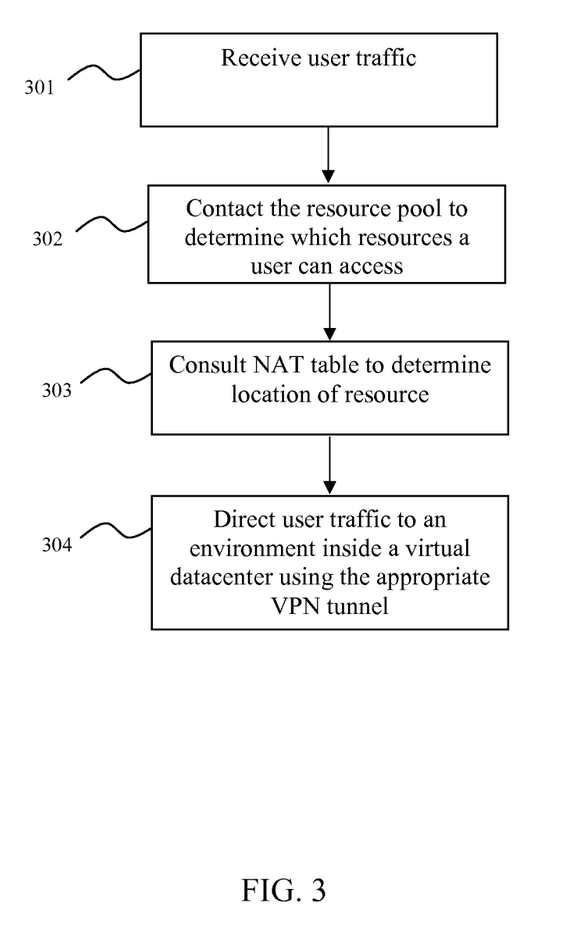
FIG. 3 is a flow chart illustrating the role of a gateway and resource pool.

FIG. 3 is a flow chart illustrating the role of the gateway server 101 and resource pool 102 in an embodiment. At 201 the gateway server 101 receives user traffic. At 302 the gateway server contacts the resource pool 102 to determine which resources the user is allowed to access. At 303 the gateway server 101 attempts to determine the location of the provisioned resource. Once a resource has been located, the user traffic is directed to it at 304.

When determining the location of a resource the gateway server 101 or resource pool 102 may use Network Address Translation (NAT) Tables or a similar technology. The NAT mapping can be used to direct users through a network tunnel 103, such as a VPN tunnel, linking the gateway server 101 to the provisioned resource. This resource may be a client workload 106 which exists inside a virtual datacenter 100.

The gateway server 101 and resource pool 102 may also aid in the portability and management of the virtual datacenters 100. In some embodiments, these elements exist independent of the virtual datacenters 100. A user can move their virtual datacenter 100 between hosting locations 202 and still access that environment through the same gateway server 101. This could be accomplished by updating a NAT table or other routing mechanism. Further, one gateway server 101 and resource pool 102 can be used to manage a plurality of virtual datacenters 100. For example, a supplier can create multiple virtual datacenters 100 on their hosting location 202. The supplier could then assign these virtual datacenters 100 to different users who can transfer them as desired. The supplier could still access these environments as necessary though the gateway server 101. Such access could be used to conduct maintenance on the virtual datacenters 100 or to ensure best practice policies are enforced.

In some embodiments, the gateway server 101 and resource pool 102 may be secured by a firewall. This firewall aids in preserving the integrity of the system and the underlying virtual datacenters. The firewall could be established, for example, through the use of VMware's vShield technology. vShield Edge could be used to secure the gateway server 101 or individual virtual datacenters 100. vShield could also be leveraged to protect individual workloads 104 and 106 within a datacenter. vShield App, or a similar technology, may be used to monitor network traffic on the virtual network 105 which connects the workloads 104 and 106 together and to the gateway server 101. Other technologies could also be used to protect individual workloads 104 and 106. These technologies could be used to firewall workloads 104 or 106, virtual machines inside those workloads, or virtual network 105.

Figure 4:
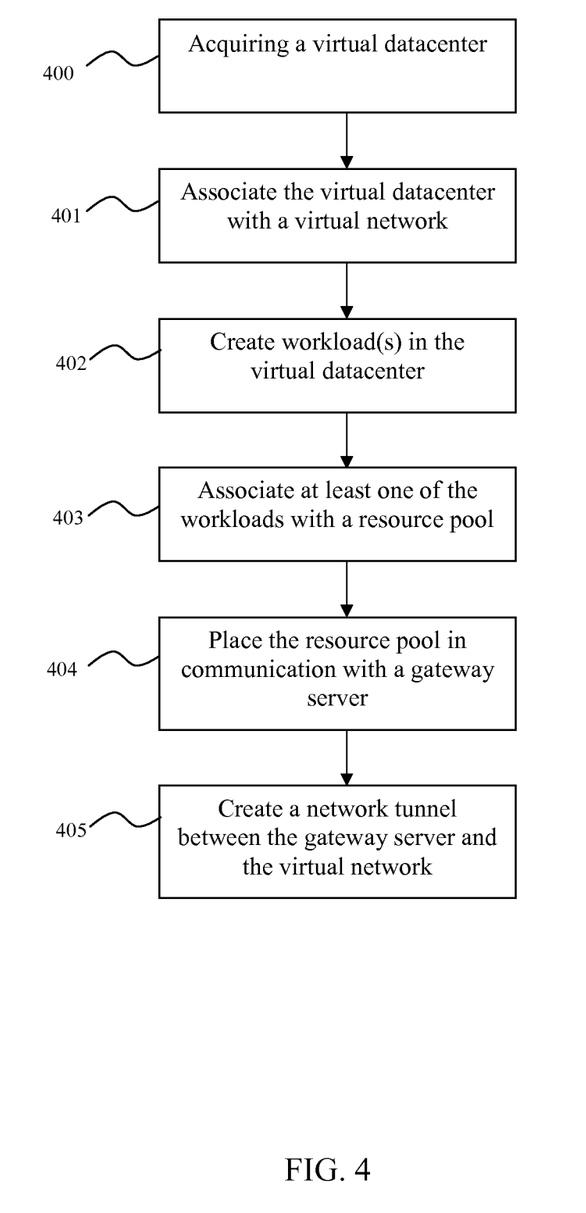
FIG. 4 is a flow chart illustrating the creation and operation of a virtual datacenter.

FIG. 4 is a flow chart illustrating the creation and operation of a virtual datacenter 100. At 400, a virtual datacenter 100 is acquired. In some embodiments, the virtual datacenter 100 may be acquired by building an "organization" using VMware's vCloudDirector tool. At 401 the virtual datacenter 100 can be associated to a virtual network 105. At 402, a plurality of workloads may be created within the datacenter. To facilitate portability, one of the workloads may be a client workload 106, such as a remote desktop server. Each of these workloads may be in communication with the virtual network 105. At 403 at least one of the workloads can be associated with a resource pool 102 which may later be used to provision environments to users. At 404 the resource pool 102 can be placed in communication with a gateway server 101, wherein the gateway server may be connected to an outside network 107. At 405 a network tunnel 103 could be created between the gateway server and the virtual network.

Figure 5:
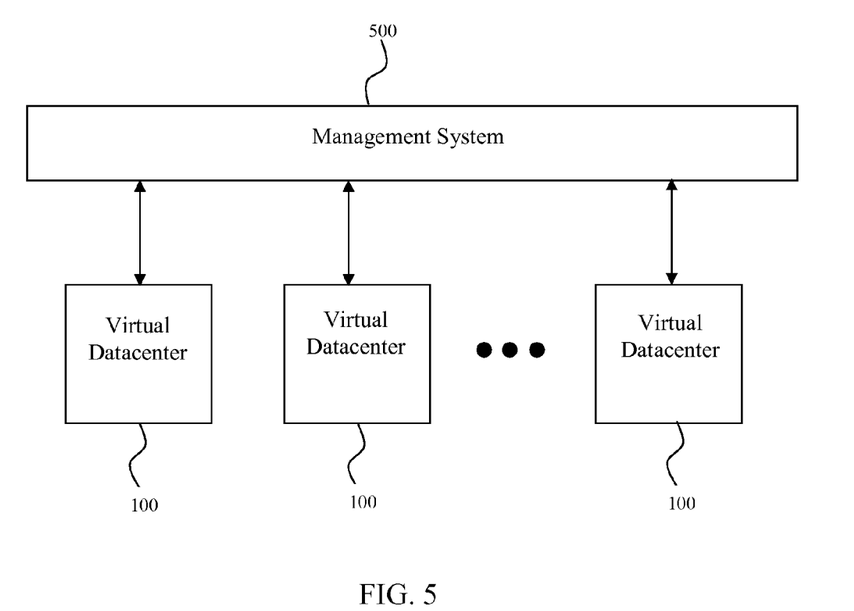
FIG. 5 is an overview of a virtual datacenter management system.

FIG. 5 is an overview of a virtual datacenter management system. Management system 500 is in communication with a plurality of virtual datacenters 100 that are associated with that system. Management system 500 may be run on a general or specific purpose computing device, and may be implemented in either hardware or computer readable code.

Virtual datacenters 100 may have a plurality of status monitoring applications installed in one or more workload 104 or 106. For example, a virtual datacenter 100 may have a workload 104 or 106 comprising a single virtual machine running antivirus software. This antivirus software could be configured to protect one or more workloads 104 or 106 or the virtual datacenter 100 as a whole. This software may be exposed to the management system 500 over virtual network 105 or network tunnel 103. A user of the management system 500 could therefore monitor the status of every virtual datacenter 100 in the system by accessing the management system 500 alone. In addition to antivirus software, other monitoring applications could include, but are not limited to, anti-malware, application health, resource monitoring, firewalls, network monitoring, intrusion detection/prevention, and file transfer.

Management system 500 may also be used to manage gateway server 101 and resource pool 102. Similar to the gateway server 101 and resource pool 102, the management system 500 may have access to individual virtual datacenters 100 regardless of their actual location. For example, if a virtual datacenter 100 is created on an off-premise hosting location 202 and is later moved by a user to an on-premise environment, the management system 500 could still manage that datacenter. This allows users to freely move virtual datacenters 100 while managing them from a centralized location.

Management system 500 may also allow service providers to maintain access and control inside a user's virtual datacenter 100. This could allow service providers to quickly trouble shoot any issues a user may have, regardless of the location of the virtual datacenter 100. It may also allow for expedient updates or installation of new software.

Figure 6:
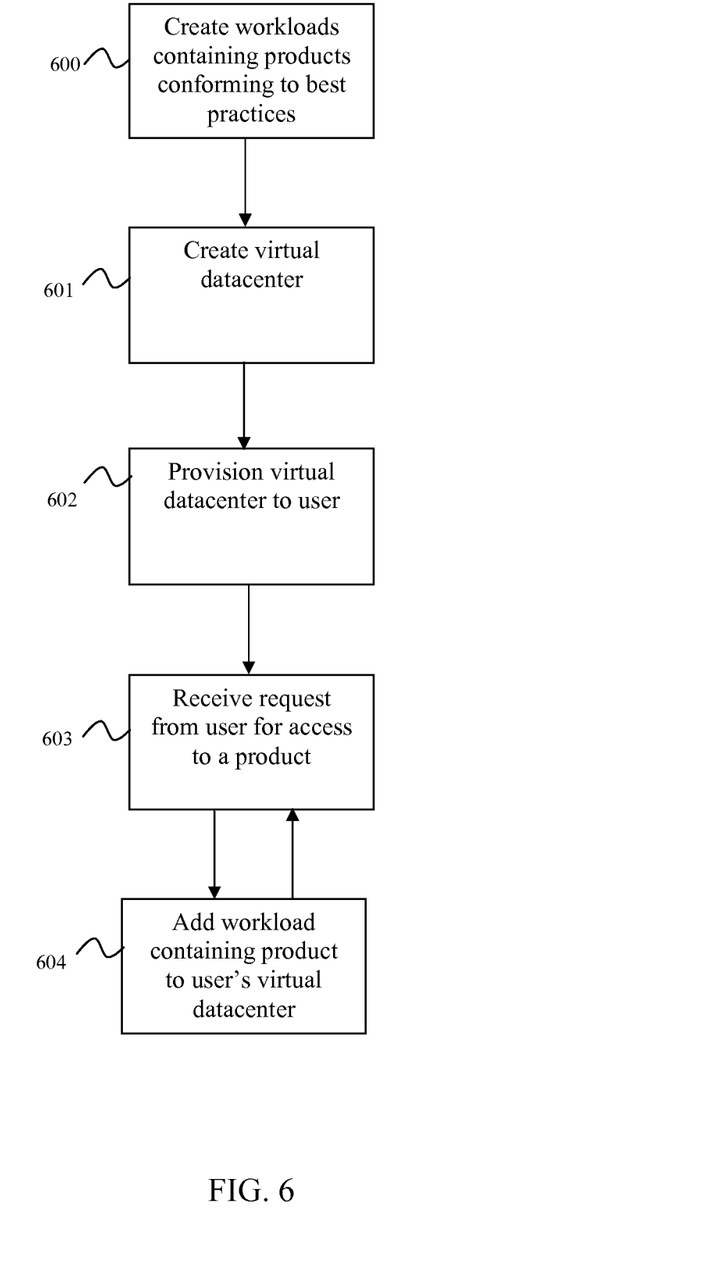
FIG. 6 is a flow chart illustrating granting users access to various products inside their virtual datacenter.

FIG. 6 is a flow chart illustrating granting users access to various products inside their virtual datacenter. At 600 a plurality of workloads containing different software solutions may be created. These solutions may comply with a supplier's best practices. At 601 a virtual datacenter can be created and at 602 this virtual datacenter may be assigned to a user. At 603 a user can request access to a software product from an authorized entity. At 604 one of the previously created workloads containing the desired product could be transferred to the user's virtual datacenter 100. 603 and 604 may be repeated as often as necessary to grant a user access to products embodied in workloads.

Transferring preconfigured workloads to a user's virtual datacenter 100 has numerous advantages. It may significantly reduce time and monetary expenses because there is no need for the user to purchase and configure new equipment. This method may also reduce the need for the user to install and configure the desired software in a new environment. Further, it could ensure that best practices are always followed because the workloads may be configured by the service provider.

Transferring preconfigured workloads may be facilitated using the management system 500. This allows workloads to be transferred to any virtual datacenter 100 regardless of its location. It has the further advantage of allowing the service provider to monitor the health and status of the product contained in the workload as it runs in the user's virtual datacenter 100. This may enhance service areas such as customer support because the service provider could quickly access and troubleshoot malfunctioning products. The management system 500 can also be used to ensure that delivered products are always up-to-date. If the service provider can access a user's system, they can automatically installed patches and updates as required. This again serves to ensure the product best practices are always followed.

In an embodiment, preconfigured workloads may be placed in a user's virtual datacenter 100 prior to their request. For example, a supplier could install a plurality of preconfigured workloads in a user's virtual datacenter 100 prior to provisioning it to the user. The workloads could be access restricted so that the user can only access ones they have requested. This may further reduce distribution time because there is no longer a need to transfer a workload at the user's request. All the supplier needs to do is grant the user permission to access that workload. As new products are released they could automatically or manually be transferred to the user's virtual datacenter 100. This embodiment may provide nearly instantaneous access to any product the supplier provides.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for operating a virtual datacenter in a computer system, comprising:
    associating a virtual datacenter with a first virtual network;
    creating a first plurality of workloads in the virtual datacenter, wherein at least one of the first plurality of workloads includes a client environment workload and each of the first plurality of workloads is in communication with the first virtual network;
    associating the client environment workload with a resource pool, wherein the resource pool is in communication with a gateway server;
    creating a first network tunnel between the gateway server and the first virtual network;
    associating a second virtual datacenter with a second virtual network;
    creating a second plurality of workloads in the second virtual datacenter, wherein at least one of the second plurality of workloads in the second virtual datacenter includes a second client environment workload and each of the second plurality of workloads in the second virtual datacenter is in communication with the second virtual network;
    associating the second client environment workload in the second virtual datacenter with the resource pool;
    creating a second network tunnel between the gateway server and the second virtual network; and
    transferring the first virtual datacenter or the second virtual datacenter between at least two hosting locations, wherein the transferred virtual datacenter remains in communication with the gateway server after the transfer.

2. The method of claim 1, wherein one of the client environment and the second client environment includes a remote desktop.

3. The method of claim 1, wherein the first virtual datacenter comprises a workload including a server environment.

4. The computer program product of claim 1, wherein the resource pool is access restricted.

5. A computer program product for operating virtual datacenter, comprising a non-transitory computer usable medium having machine readable code embodied therein for:
    associating a virtual datacenter with a first virtual network;
    creating a first plurality of workloads in the virtual datacenter, wherein at least one of the first plurality of workloads includes a client environment workload and each of the first plurality of workloads is in communication with the first virtual network;
    associating the client environment workload with a resource pool, wherein the resource pool is in communication with a gateway server;
    creating a first network tunnel between the gateway server and the first virtual network;
    associating a second virtual datacenter with a second virtual network;
    creating a second plurality of workloads in the second virtual datacenter, wherein at least one of the second plurality of workloads in the second virtual datacenter includes a second client environment workload and each of the second plurality of workloads in the second virtual datacenter is in communication with the second virtual network;
    associating the second client environment workload in the second virtual datacenter with the resource pool;
    creating a second network tunnel between the gateway server and the second virtual network; and
    transferring the first virtual datacenter or the second virtual datacenter between at least two hosting locations, wherein the transferred virtual datacenter remains in communication with the gateway server after the transfer.

6. The computer program product of claim 5, wherein one of the client environment and the second client environment includes a remote desktop.

7. The computer program product of claim 5, wherein the first virtual datacenter comprises a workload including a server environment.

8. The computer program product of claim 5, wherein the resource pool is access restricted.

* * * * *